US006908029B2

(12) United States Patent
Numata et al.

(10) Patent No.: US 6,908,029 B2
(45) Date of Patent: Jun. 21, 2005

(54) BILL COUNTER

(75) Inventors: Toshio Numata, Himeji (JP); Tomoyasu Sato, Himeji (JP); Shinji Matsuura, Himeji (JP); Hajime Morino, Himeji (JP); Takayoshi Yano, Himeji (JP)

(73) Assignee: Glory Ltd., Hyogo (JP)

( * ) Notice: Subject to any disclaimer, the term of this patent is extended or adjusted under 35 U.S.C. 154(b) by 111 days.

(21) Appl. No.: 10/097,114

(22) Filed: Mar. 12, 2002

(65) Prior Publication Data

US 2002/0153412 A1 Oct. 24, 2002

(30) Foreign Application Priority Data

Mar. 16, 2001 (JP) ....................................... 2001-076873
Nov. 26, 2001 (JP) ....................................... 2001-359924

(51) Int. Cl.[7] ............................ G06F 17/00; G06K 9/00
(52) U.S. Cl. ....................................... 235/375; 382/135
(58) Field of Search ................................ 235/375, 379; 194/206, 207; 382/135, 137; 209/534

(56) References Cited

U.S. PATENT DOCUMENTS 4,114,804 A 9/1978 Jones et al. ................. 235/476
5,367,577 A * 11/1994 Gotaas ........................ 382/135
5,430,664 A * 7/1995 Cargill et al. ............... 194/207
5,909,503 A * 6/1999 Graves et al. .............. 382/135
5,964,336 A * 10/1999 Itako et al. ................. 194/207
5,966,456 A 10/1999 Jones et al. ................. 382/135
6,241,069 B1 * 6/2001 Mazur et al. ............... 194/207
6,493,461 B1 * 12/2002 Mennie et al. .............. 382/135

FOREIGN PATENT DOCUMENTS

JP 53-44089 4/1978
WO 99/48040 9/1999

* cited by examiner

*Primary Examiner*—Michael G. Lee
*Assistant Examiner*—Daniel A. Hess
(74) *Attorney, Agent, or Firm*—Ladas & Parry LLP

(57) ABSTRACT

To provide a bill counter that does not require designation of detectors effective for authenticity/counterfeit determination corresponding to counterfeit preventive countermeasures and yet enables counting only by designation of kinds of bills issued by the nations concerned. The present invention is a bill counter comprising, a bill type memory means wherein kinds of bills and detector groups selected among the plural kinds of detectors with different determining principles are related with each other and memorized in advance, and a bill type selecting means for selecting the bill types memorized in the bill type memory means as counting objective bills, characterized by that corresponding to the selection of bills by the bill type selecting means, the corresponding detector groups memorized in advance in the bill type memory means are specified, and authenticity/counterfeit determination is conducted by the specified detector groups.

14 Claims, 10 Drawing Sheets

BILL COUNTER

BACKGROUND OF THE INVENTION

1. Field of the Invention

The present invention relates to a bill counter having the function to determine whether bills are authentic or not.

Further, the present invention relates to a bill counter, more specifically relates mainly to a bill counter having plural kinds of authenticity/counterfeit determining means that enables to easily conduct authenticity/counterfeit determination, without need for an operator to set how to determine with which kind of authenticity/counterfeit means according to characteristics of objective bills.

2. Description of the Related Art

Bill counters having the function to determine whether bills are authentic or not can roughly be divided into two. The first type of bill counter specifies face value kinds of objective bills, and conducts authenticity/counterfeit determination according to the specified face value kinds. On the other hand, the second type of bill counter conducts authenticity/counterfeit determination, without specifying face value kinds, and configured to conduct authenticity/counterfeit determination according to characteristics not depending upon face value kinds.

Bill counters belonging to the above second type having plural different kinds of authenticity/counterfeit determining means (detectors) are already disclosed to those skilled in the art, and there are, for example, one bill counter disclosed in the U.S. Pat. No. 4,114,804 and another disclosed in Japanese Patent Application Laid-open No. 53-44089 A by the same applicant.

These publications disclose means for detecting magnetic ink and means for detecting fluorescent reaction as authenticity/counterfeit determining means, and in the case wherein the magnetic ink is detected in a bill to be inspected and also fluorescent reaction is not detected, the bill inspected is determined as an authentic bill.

In the first place, the bill counters disclosed in these publications are supposed to be used to handle only U.S. bills, as described in their specifications, therefore, authenticity/counterfeit means are selected and combined according to the characteristics of the U.S. bills. Namely, they employ the determining method based on the characteristics that the US bills (authentic bills) use magnetic ink, and fluorescent reaction is not detected in them.

While, in the Euro bloc, there is a demand for a bill counter equipped with authenticity/counterfeit determining function to handle both Euro bills and U.S. dollar bills circulated all over the world. Further, in nations neighboring to the Euro bloc, there is a demand for a bill counter equipped with authenticity/counterfeit determining function to handle not only the Euro bills and the U.S. dollar bills but also bills of their own nations.

The counterfeit bill preventive countermeasures vary with respective nations, and various countermeasures, for instance, adoption of infrared ray absorbing ink, interweaving of threads and so forth, are taken, therefore, in order to handle these bills, it is naturally required to adopt an infrared ray absorbing ink detector and a thread detector. By loading plural authenticity/counterfeit determining functions corresponding to these various counterfeit bill preventive countermeasures, it is possible to make a general purpose bill counter that handles bills of many countries.

However, in order to make the most of the above general purpose bill counter, it is necessary for operators to be well informed of the contents of counterfeit preventive countermeasures concerning bills to be inspected, and set detectors according to the counterfeit preventive countermeasures, as a consequence, complicated settings has to be done and it can't easily be used, which has been a problem with the prior art.

While, there is a demand for a bill counter equipped with authenticity/counterfeit determining function to handle both Euro bills and US dollar bills circulated all over the world, in nations over the world, besides the above, various counterfeit preventive countermeasures, for instance, adoption of infrared ray absorbing ink, interweaving of threads and so forth, are taken in respective nations, therefore, in order to handle these bills under various counterfeit preventive countermeasures, only magnetic ink detection and fluorescent reaction detection mentioned above are not sufficient, but it is naturally required to adopt an infrared ray absorbing ink detector and a thread detector.

By loading authenticity/counterfeit determining functions corresponding to these various counterfeit bill preventive countermeasures, it is possible to make a general-purpose bill counter that handles bills of many nations. However, in order to make the most of the general purpose bill counter, it is necessary for operators to be well informed of the contents of counterfeit preventive countermeasures concerning bills to be inspected, and set detectors according to the counterfeit preventive countermeasures, as a consequence, complicated settings must be done and it is hard to use, which has been a problem with the prior art.

SUMMARY OF THE INVENTION

The present invention has been made in consideration of the above problems with the prior art, accordingly an object of the present invention is to provide a bill counter that does not require designation of detectors effective for authenticity/counterfeit determination corresponding to counterfeit preventive countermeasures of bills issued by major nations (for example, Euro bills and U.S. dollar bills), and yet enables counting only by designation of kinds of bills issued by the nations concerned.

Another object of the present invention is to provide a bill counter that does not require designation of authenticity/counterfeit determining means corresponding to counterfeit bill preventive countermeasures.

The present invention relates to a bill counter that does not require designation of detectors effective for authenticity/counterfeit determination corresponding to counterfeit preventive countermeasures, and yet enables counting only by designation of kinds of bills issued by the nations concerned, and the above purpose of the present invention is attained by a bill counter comprising a bill loading section where plural bills are loaded, a feeding means for feeding the above bills individually, a transfer means for transferring the above bills fed by the above feeding means to a collecting section, and an authenticity/counterfeit determining means arranged between the above feeding means and the above collecting section and comprising plural kinds of detectors with different determining principles for determining whether the above bills are authentic or not, further comprising, a bill type memory means wherein kinds of bills and detector groups selected among the above plural kinds of detectors with different determining principles are related with each other and memorized in advance, and a bill type selecting means for selecting the bill types memorized in the above bill type memory means as counting objective bills, and the above bill counter characterized by that corresponding to the selection of bills by the above bill type selecting means, the above corresponding detector groups memorized in advance in the above bill type memory means are specified, and authenticity/counterfeit determination is conducted by the above specified detector groups.

The above purpose of the present invention is further effectively attained by that the bill types to be memorized in advance in the above bill type memory means include at least Euro bills and U.S. dollar bills and furthermore, by that the above U.S. dollar bills are sorted into bills with face value 100 dollars and bills with other face values, and authenticity/counterfeit determination is conducted by plural kinds of detectors with different determining principles according to the respective kinds of face values.

The present invention relates to a bill counter that does not require designation of authenticity/counterfeit determining means corresponding to counterfeit bill preventive countermeasures, and the above purpose of the present invention is attained by a bill counter comprising a bill loading section where plural bills are loaded, a feeding means for feeding the above bills individually, a transfer means for transferring the above bills fed by the above feeding means to a collecting section, and an authenticity/counterfeit determining means arranged between the above feeding means and the above collecting section for determining whether the above bills are authentic or not, wherein, the above authenticity/counterfeit determining means comprises plural kinds of detectors with different determining principles, and further comprises a determination condition memory means for detecting presence or absence of output in each of the above plural kinds of detectors with different determining principles on the firstly fed one of the above bills, and for memorizing the detection result, and a condition match comparing means for comparing detection results in the above plural kinds of detectors with different determining principles on the secondly fed one of the above bills and thereafter with the detection result memorized in the above determination condition memory means, and as a result of the above comparison, in the case wherein at least one of the detection results in the above plural kinds of detectors does not match, the above authenticity/counterfeit determining means determines that the bill concerned is a counterfeit bill.

The above purpose of the present invention is further effectively attained by that with regard to the detector wherein there is not outputted on the firstly bill among the above plural kinds of detectors with different determining principles, the output on the secondly fed bill and thereafter in the detector concerned is excluded from authenticity/counterfeit conditions, or by that the above plural kinds of detectors with different determining principles include one of magnetic detection fluorescent reaction detection, thread detection and infrared ink detection.

Further, the above purpose of the present invention is more effectively attained by a bill counter wherein in the case of any discrepancy in determination conditions as a result of authenticity/counterfeit determination by the above detectors, the above transfer means is controlled to stop, or by a bill counter further comprising a display section for displaying indications concerning the detectors wherein there is outputted on the above first fed bill among the above detectors.

Still further, the above purpose of the present invention is easily and simply attained by a bill counter comprising a bill loading section where plural bills are loaded, a feeding means for feeding the above bills individually, a transfer means for transferring the above bills fed by the above feeding means to a collecting section, and an authenticity/counterfeit determining means arranged between the above feeding means and the above collecting section for determining whether the above bills are authentic or not, wherein, the above authenticity/counterfeit determining means comprises a single kind of detectors, and further comprises a determination condition memory means for detecting presence or absence of output in the above detectors on the firstly fed one of the above bills, and for memorizing the detection result, and a condition match comparing means for comparing detection results in the above detectors on the secondly fed one of the above bills and thereafter with the detection result memorized in the above determination condition memory means, and as a result of the above comparison, in the case wherein output presence and does not match, the above authenticity/counterfeit determining means determines that the bill concerned is a counterfeit bill.

Yet still further, the above purpose of the present invention is more effectively attained by a bill counter comprising a bill loading section where plural bills are loaded, a feeding means for feeding the above bills individually, a transfer means for transferring the above bills fed by the above feeding means to a collecting section, and an authenticity/counterfeit determining means arranged between the above feeding means and the above collecting section for determining whether the above bills are authentic or not, wherein, the above authenticity/counterfeit determining means comprises of a single kind of detectors, wherein presence or absence of output in the above detectors is detected on the firstly fed bill, and in the case wherein output on the firstly bill in the above authenticity/counterfeit determining means is not detected, the output on the secondly fed bill and thereafter in the above authenticity/counterfeit determining means is ignored.

DESCRIPTION OF THE PREFERRED EMBODIMENTS

Figure 1:
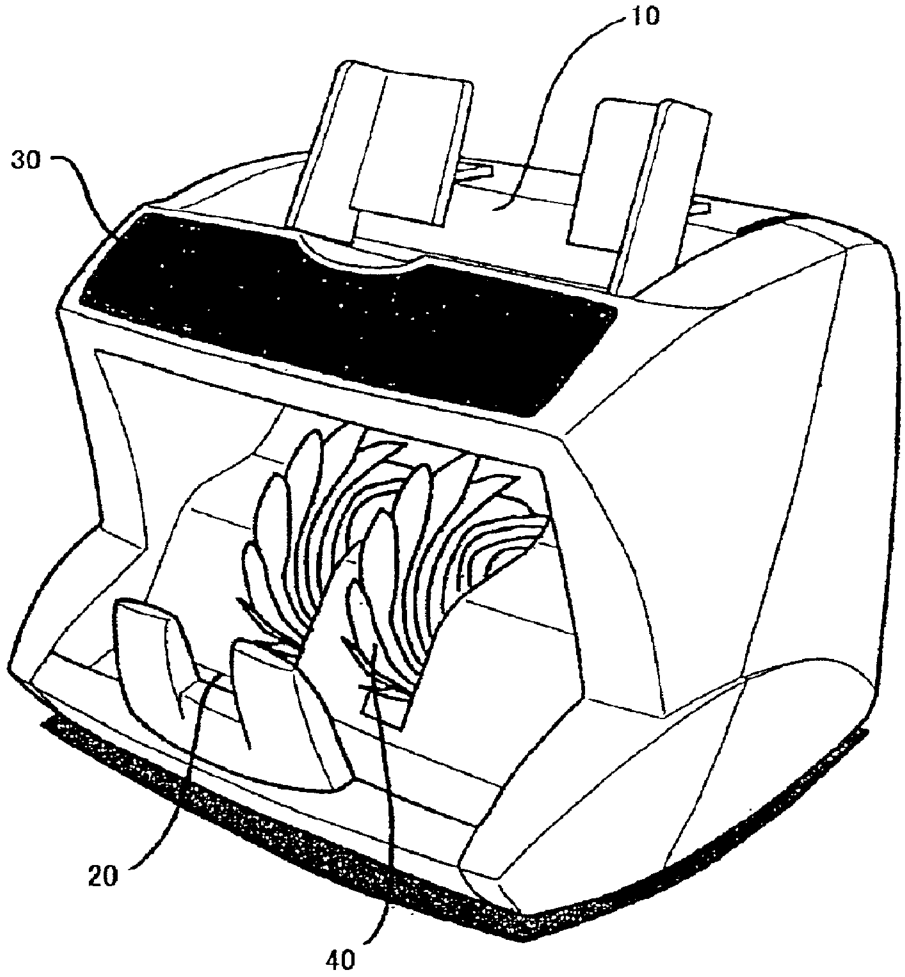
FIG. 1 is an external view of a bill counter according to the present invention.

FIG. 1 is an external view of a bill counter according to the present invention, wherein the the numeral 10 represents a bill loading section, the numeral 20 represents a collecting section, the numeral 30 represents an operation/display section, and the numeral 40 represents an impeller for receiving bills transferred by a transfer means not illustrated herein one by one in between the blades thereof and accumulate bills in a queue into the collecting section 20.

Figure 2:
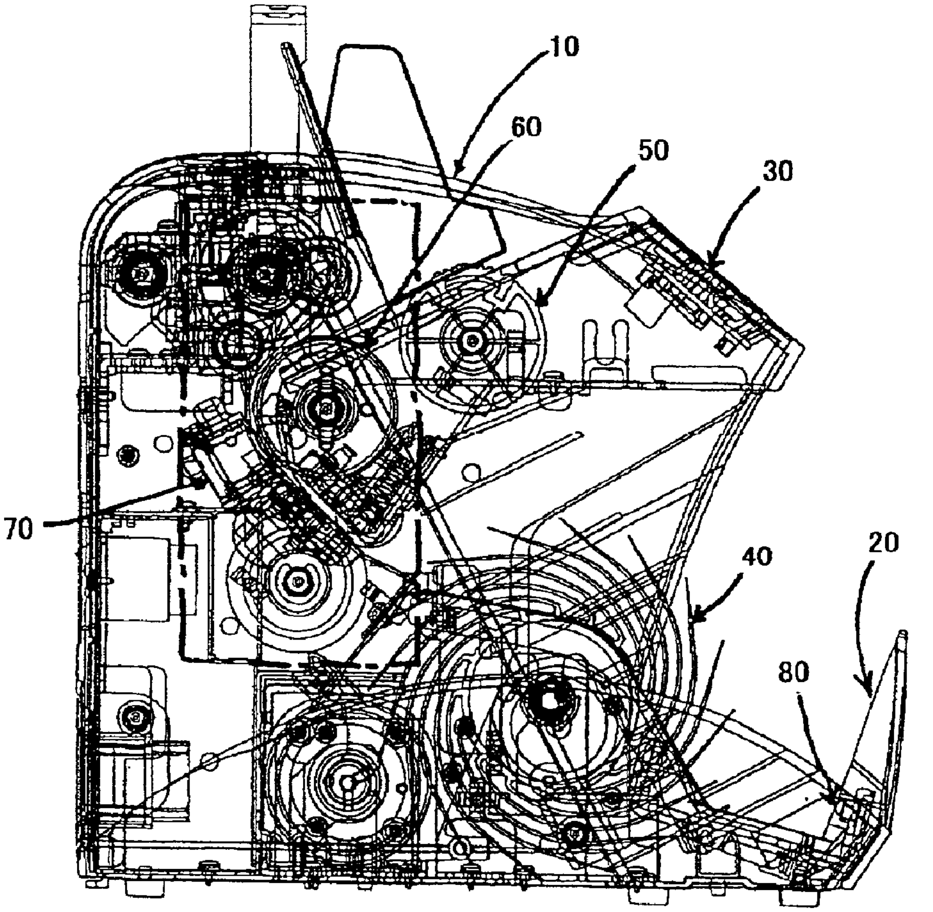
FIG. 2 is a cross sectional view showing the entire bill counter.

FIG. 2 is a cross sectional view showing the entire bill counter, wherein the numeral 10 represents a bill loading section, the numeral 20 represents the collecting section, the numeral 30 represents the operation/display section, the numeral 40 represents an impeller, the numeral 50 represents a feeding roller as feeding means, the numeral 60 is a transfer roller as transfer means, the numeral 70 is an authenticity/counterfeit determination block comprising of plural kinds of detectors, and the numeral 80 represents a stacker sensor for detecting whether there are bills on the collecting section 20 or not.

Figure 3A:
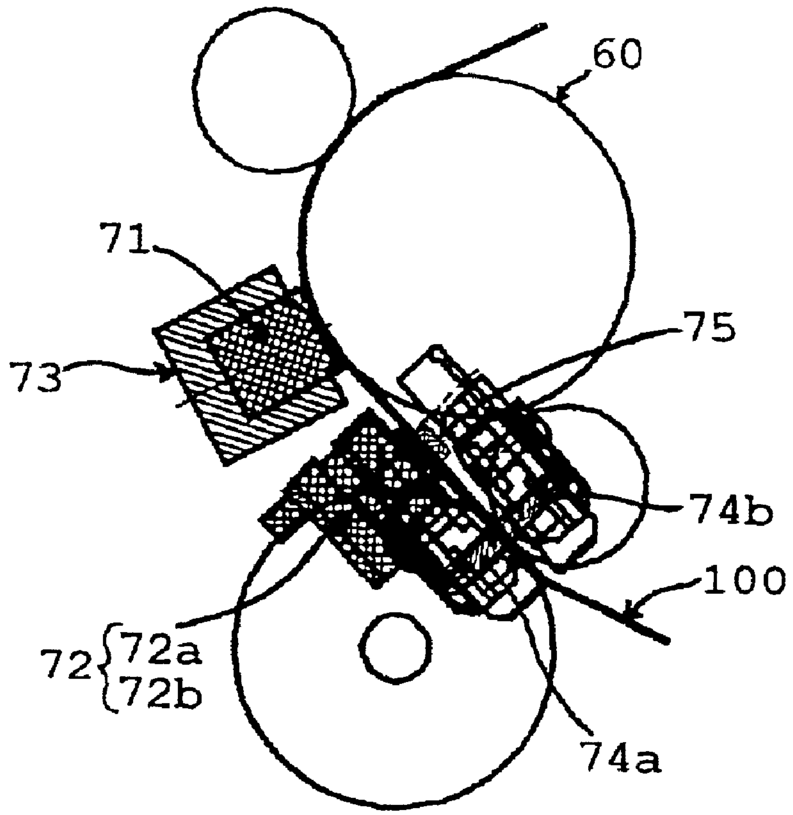
FIGS. 3A and 3B are views showing the arrangement of detectors for authenticity/counterfeit determination.
Figure 3B:
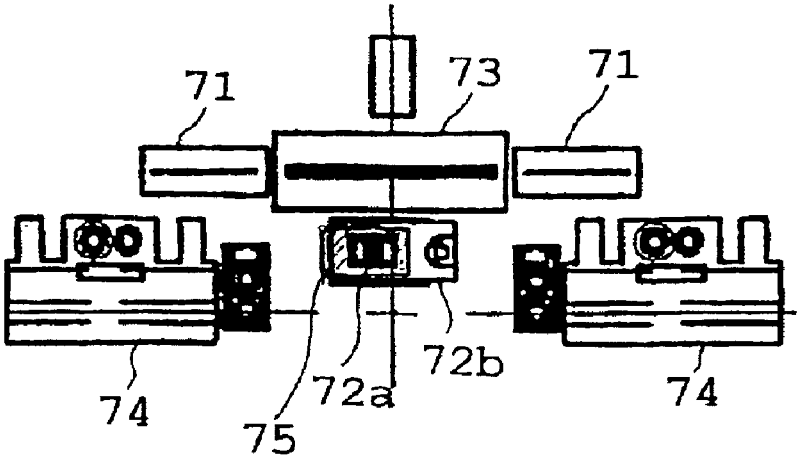

FIGS. 3A and 3B are views showing the arrangement of detectors for authenticity/counterfeit determination and so forth. FIG. 3A is a view showing the arrangement of the authenticity/counterfeit determination block 70, and also a schematic one typhically showing enlargement of the section entangled by dot line in FIG. 2. While, FIG. 3B is a view of top view of FIG. 3A, showing the relative positional relations of respective detectors.

In the figures, the numeral 71 is a magnetic detector comprising a magnetic head for detecting magnetic ink, and the numeral 72 is a reflection type fluorescent reaction detector comprising an ultraviolet (UV) ray radiation light source 72*a* and a visible light receiving element 72*b*, for detecting presence or absence of fluorescent reflected light from bills inspected according to ultraviolet ray radiated from the ultraviolet ray radiation light source 72*a* by the visible light receiving element 72*b*, and 73 is a thread detector for detecting thread of bills, and the numeral 74 is a permission type infrared detector comprising an infrared ray radiation light source 74*a* and an infrared light receiving element 74*b*, for detecting the infrared ray amount of bills inspected after infrared ray radiation from the infrared ray radiation light source 74*a* by the infrared ray receiving element 74*b*, while the numeral 75 is a permission type ultraviolet detector for detecting the ultraviolet amount of bills inspected after ultraviolet ray radiation from the ultraviolet ray radiation light source 72*a*. The numeral 100 is a schematic view showing bills passing through respective detectors.

Figure 4:
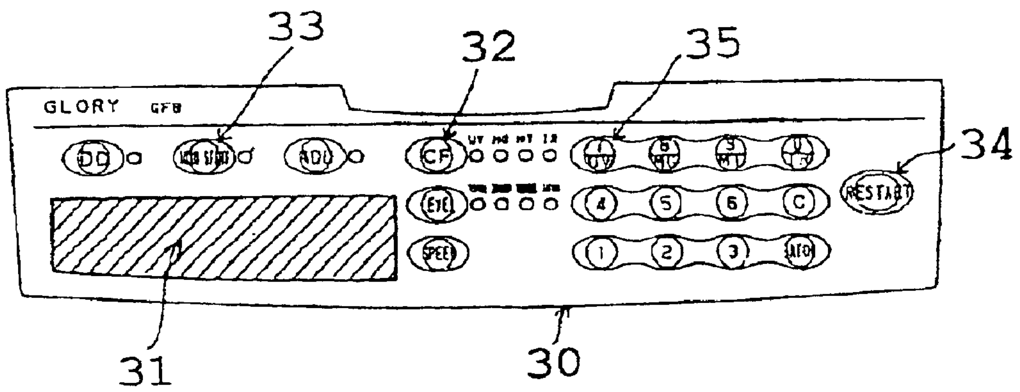
FIG. 4 is a view showing an example of the operation/display section.

FIG. 4 is a view showing an example of the operation/display section 30 arranged at the top of a bill counter, wherein the display section 31 is for displaying counting results, and comprises, for example, a 7-segment and a liquid crystal panel and the like. A determination mode selecting means and bill type selecting means 32 is for selecting specified detectors by combination of a "CF" key and numeric keys 35, and selecting kinds of bills to be inspected.

In the present preferred embodiment, for example, when "CF" key 32 is pressed down and then "7/UV" key is pressed, the ultraviolet detector gets effective, and in this status when further "8/MG" key is pressed down, both the ultraviolet detector and the magnetic detector become effective. As a result, the indication lamps UV and MG at the right side of the "CF" key are lit, showing that these detectors are selected.

When the "CF" key 32 is pressed down, and then "1" key is pressed, U.S. 100 dollar bill is selected, and detector group for the U.S. 100 dollar bill memorized in bill type memory means 110 to be described later herein is selected. In the case of the present invention, as described later, this one operation enables to select 3 detectors, i.e., magnetic detector, fluorescent reaction detector and ultraviolet detector. As a consequence, operators can conduct authenticity/counterfeit determination only by selecting the U.S. 100 dollar bill, without knowing the kind of detectors corresponding to the U.S. 100 dollar bills. The codes 33 and 34 are counting start keys, and the former one is "AUTO START" key, while the latter is "RESTART" key.

Figure 5:
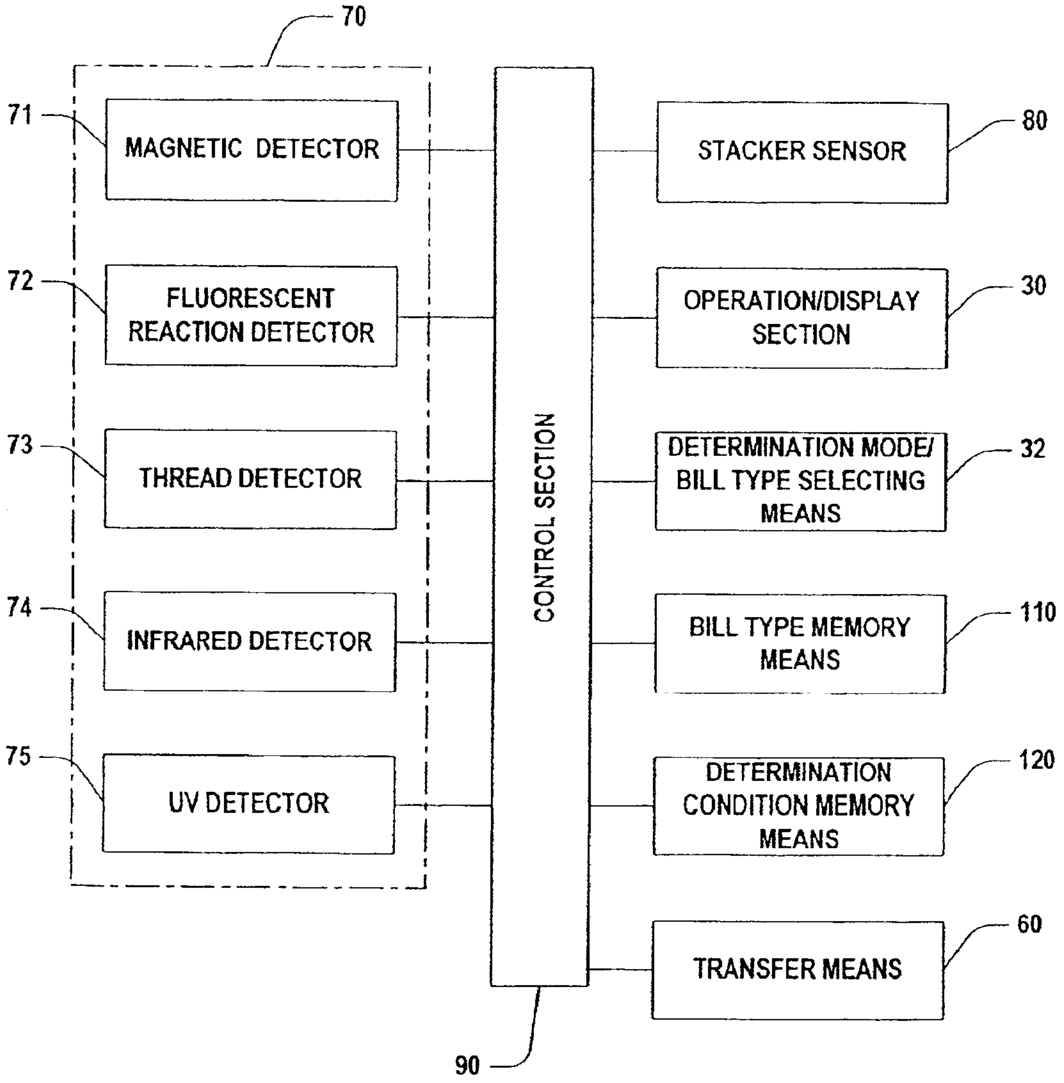
FIG. 5 is a block diagram concerning the configuration of the present preferred embodiment.

FIG. 5 is a block diagram concerning the configuration of the present preferred embodiment. In the figure, the authenticity/counterfeit determination block 70 comprises 5 kinds of detectors in total. As the magnetic detector 71, for example, a known magnetic head may be employed. The fluorescent reaction detector 72 comprises an ultraviolet ray radiation light source 72*a* and a visible light receiving element 72*b*. As the thread detector 73, for example, one disclosed in Europe Patent Publication No. EP413534 A may be used. The infrared detector 74 comprises an infrared ray radiation light source 74*a* and an infrared ray receiving element 74*b*. The ultraviolet detector 75 comprises a permission type ultraviolet ray receiving element. The transfer means 60 is for feeding bills into the authenticity/counterfeit determination block. The stacker sensor 80 is for detecting whether there are bills on the collecting section or not. The operation/display section 30, when detecting bills with suspicion of counterfeit, displays to that effect. The determination mode/bill type selection means 32 is used for any case of the followings.

The first case is that an operator, who knows well the contents of counterfeit preventive countermeasures of the bills to be inspected, selectively specifies detectors effective for the bills to be inspected. In this case, as mentioned above, for example, when the "CF" key 32 is pressed down, and then the "8/MG" key in common use with numeric keys is pressed, authenticity/counterfeit determination is conducted by the magnetic detector 71. This is determination mode selection, which is the prior method.

The second case pertains to the present invention, wherein only by selectively specifying the kinds of bills, detectors effective for the selectively designated bills are automatically selected, and in this case, when for example the "CF" key 32 is pressed down, and then the "1" key among the numeric keys is pressed down, then the U.S. 100 dollar mode gets effective, and in this mode, authenticity/counterfeit determination is conducted by the magnetic detector 71, the fluorescent reaction detector 72 and the ultraviolet detector 75. Into the bill type memory means 110, data designating which detectors are effective for at least Euro bills and the U.S. dollar bills is registered in advance. In more concrete, as for Euro bills, 4 kinds of detectors in total, i.e., the magnetic detector, the fluorescent reaction detector, the threads detector and the infrared detector are registered, while as for the U.S. dollar bills, 2 kinds of detectors in total, namely the magnetic detector and the fluorescent reaction detector are registered therein. In addition, with regards to the U.S. dollar bills, it is preferable to sort them by means of face values. In concrete, it is preferable from the current conditions of counterfeit bills of the U.S. dollar bills to sort the U.S. dollar bills into 100 dollar bills and other bills, and as for 100 dollar bills, 3 kinds of detectors in total, i.e., the magnetic detector, the fluorescent reaction detector and the ultraviolet detector should be employed, while as for other bills, 2 kinds of detector in total, i.e., the abovementioned magnetic detector and the fluorescent reaction detector should be employed. The control section 90 is for conducting the processing items shown in the flow chart in FIGS. 6A and 6B on the basis of a specified program. For example, a micro computer may be employed. Into the determination condition memory means 120, as described later herein, the output level of respective detectors in the case of authentic bills is memorized per kind of bill, and this data is compared with the actually detected values, thereby bills are determined whether authentic or not.

Figure 6A:
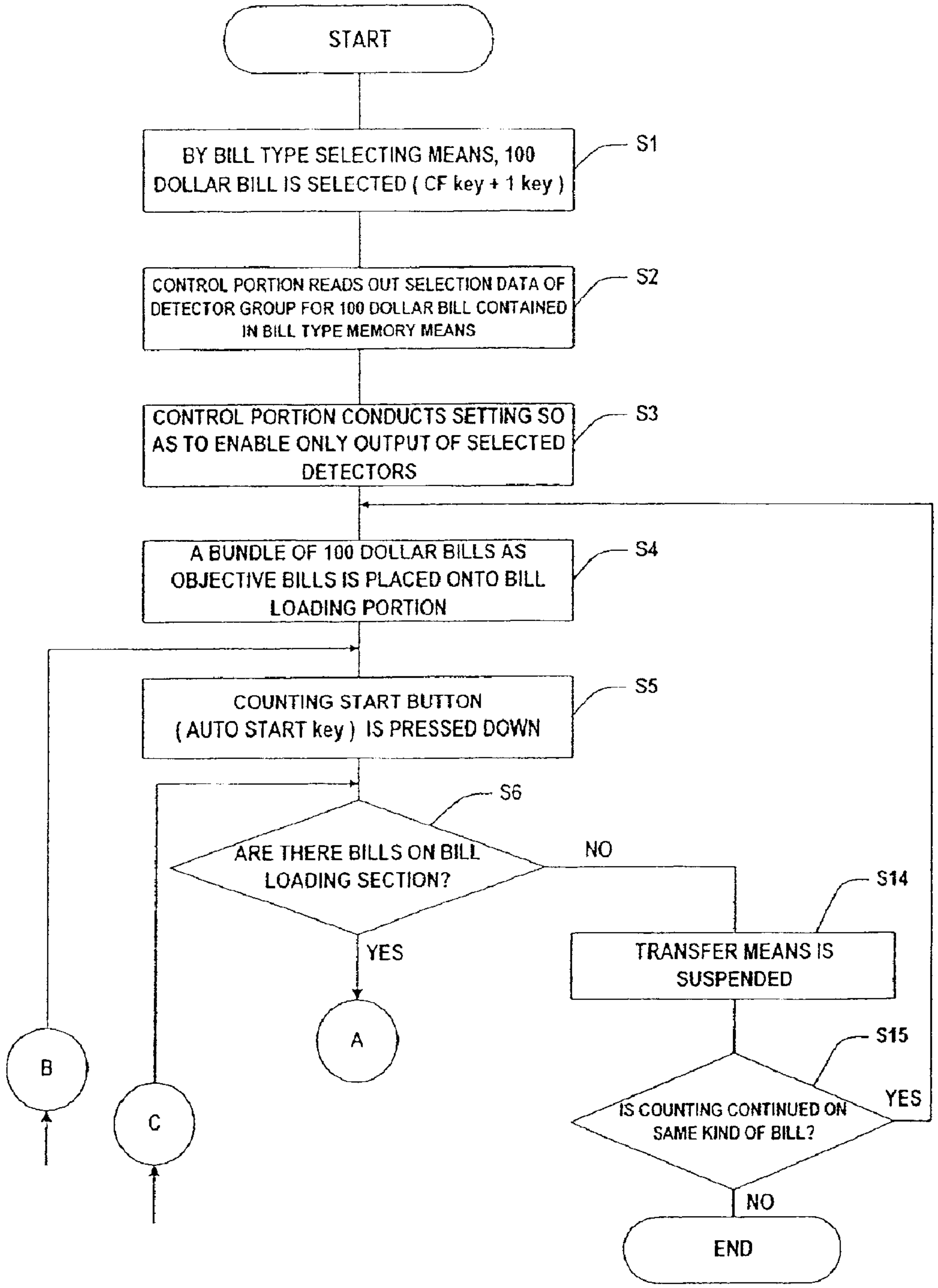
FIGS. 6A and 6B are flow charts of determination and counting by the bill counter according to the present invention.
Figure 6B:
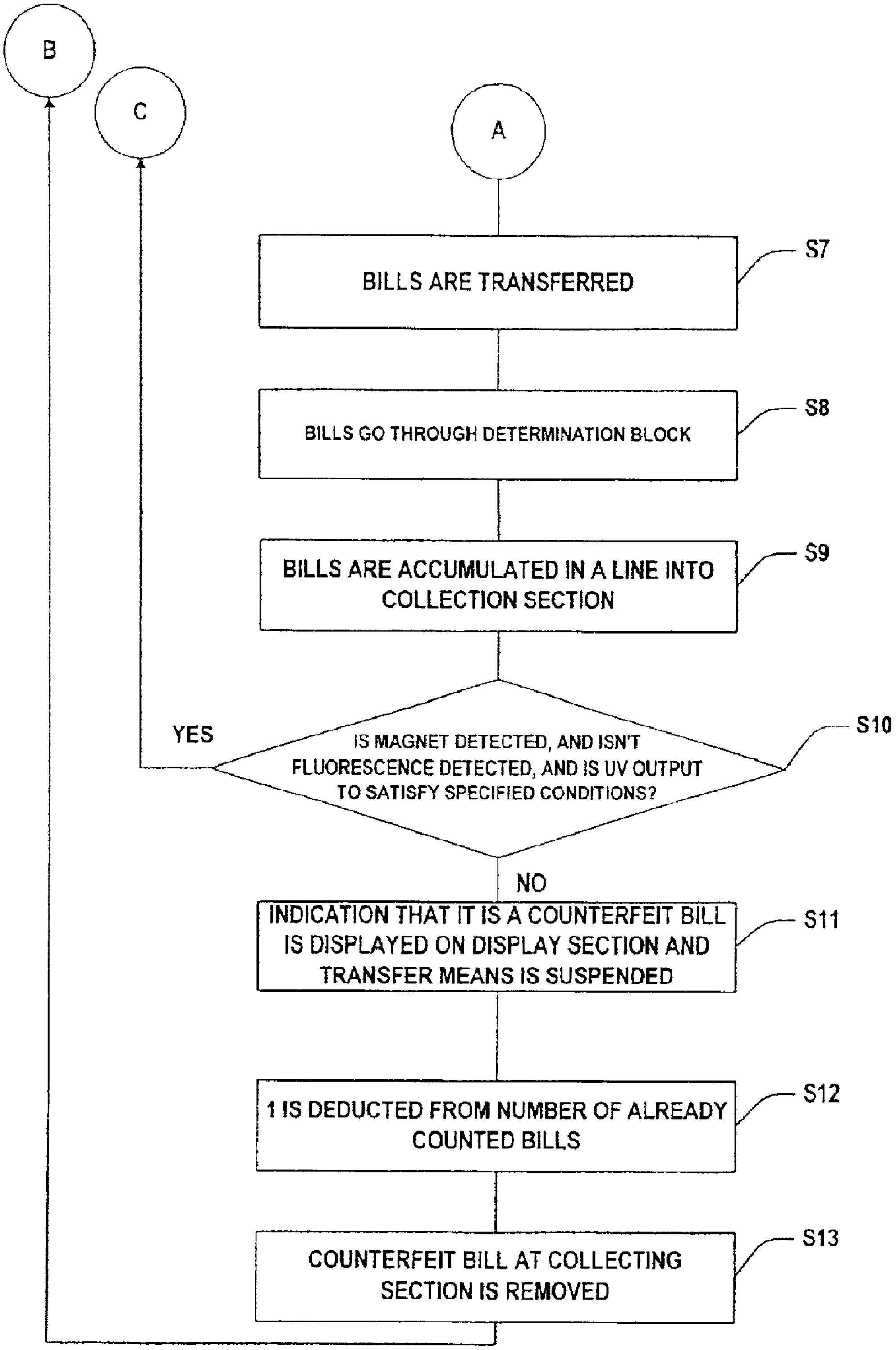

Next, in reference to the flow charts in FIGS. 6A and 6B, actions of the bill counter according to the present invention are explained hereinafter. In addition, FIGS. 6A and 6B show the case wherein bills to be inspected are U.S. 100 dollar bills, however, it goes without saying that acts in the same way as for other bills.

First, by the bill type selecting means 32, the U.S. 100 dollar bill is selected (Step S1). In concrete, after the "CF" key is pressed down, the "1" key is pressed down. When the U.S. 100 dollar bill is selected as shown above, the control section 90 reads out the selection data of detector group for the U.S. 100 dollar bill contained in the bill type memory means 110 (Step S2). In concrete, the detector group comprising 3 kinds of detectors, i.e., the magnetic detector 71, the fluorescent reaction detector 72 and the ultraviolet detector 75, is selected. On the basis of this data, the control section 90 conducts setting so as to enable only the output of these 3 kinds of detectors (Step S3). In this status, a stack of the U.S. 100 dollar bills as the objective bills is placed onto the bill loading section 10 (Step S4).

Next, the counting start button ("AUTO START" key) 33 at the operation/display section 30 is pressed down (Step S5), then if there are bills on the bill loading section ('YES' in Step S6), bills are transferred (Step S7), and the objective bills go through the authenticity/counterfeit determination block 70 (Step S8), and they are determined whether authentic or not, then they are accumulated in a line into the collection section 20 (Step S9).

As the result of authenticity/counterfeit determination, if a bill is determined as authentic bill (genuine bill) ('YES' in Step S10), the process goes back to the Step S6, and the steps from Step S6 to Step S10 are repeated so long as there are bills on the bill loading section 10 or until a bill is determined as a counterfeit bill.

In the meantime, if a bill is determined as a counterfeit bill in the Step S10 ('NO' in Step S10), an indication that it is a counterfeit bill is displayed on the display section 30, and the transfer means is suspended (Step S11). And "1" is deducted from the number of already counted bills (Step S12) and the counterfeit bill at the collecting section is removed (Step S13). Thereafter, the process goes back to the Step S5, wherein the counting start button is pressed down, and authenticity/counterfeit determination on the next bill is restarted. In this manner, counting is conducted until there is not a bill any more on the bill loading section 10, and when there is no bill left there ('NO' in Step S6), the transfer means is suspended (Step S14). Therein, if counting is continued on the same kind of bill ('YES' in Step S15), another stack of bills is placed onto the bill loading section 10 (Step S4), and the counting start button is pressed down, and counting is resumed (Step S5).

Further, the conditions for authenticity/counterfeit determination per detector in the Step S10 are as shown below.

(1) Magnetic detector 71 . . . Bills in which magnetism is detected are authentic bills.

(2) Fluorescent reaction detector 72 . . . Bills in which fluorescent reaction is not detected are authentic bills. Accordingly, bills in which fluorescent reaction is detected are counterfeit bills.

(3) Bills in which the output of ultraviolet ray going through bills fails to be at a certain level are counterfeit bills. Herein, the characteristic that counterfeit bills do not let ultraviolet ray go through is employed, and the level to be the standard herein is set on the basis of experiments.

(4) Thread detector 73 . . . Bills in which there is outputted are authentic bills, showing there are threads.

(5) Infrared detector 74 . . . Authentic bills contain infrared ray absorbing ink, therefore radiated infrared ray is absorbed, and the permission amount of infrared ray decreases. Accordingly, bill whose light receiving amount detected by the infrared ray receiving element 74*b* appears larger in comparison with that of authentic bills are determined as counterfeit bills. The standard level herein is specified in advance per kind of bill.

The above determination conditions are contained in the determination condition memory means 120.

Since this bill counter enables to handle bills of many nations, the bill counter is equipped with 5 kinds of detectors in total, and though there is an idea that bills of individual nation should be registered in advance too, but in that case, data will occupy many memory areas, and operation will be complicated, therefore, in this bill counter, only limited major kinds of bills are to be registered. As a consequence, with regard to bills that are not registered, it is necessary for an operator to selectively designate detectors effective for the bills to be inspected by himself in the same way as in the conventional operation.

For example, in the case to handle bills of the Czech Republic as one of the neighboring nations of the Euro bloc, it is necessary to selectively designate 3 kinds of detectors, namely a fluorescent reaction detector, the thread detector and an infrared detector, while in the case to handle bills of Hungary as another of Euro bloc neighboring nations, it is required to selectively designate 3 kinds of detectors, namely the magnetic detector, the fluorescent reaction detector and the infrared detector.

In the present invention, data about which detectors are effective to each bill per bill type (per issuing nation) is registered in advance, only selection of bill type is made by an operator thereof, and authenticity/counterfeit determination is conducted by detectors corresponding to the selected bill. Thereby, operation to set detectors to determine whether authentic or not regarding the selected bills is unnecessary, as a result operation properties are increased, and further operator may conduct authenticity/counterfeit determination without knowing which detectors are effective for selected bills. Further in the present invention, as the bills per bill type (per issuing nation) to be registered in prior, at least Euro bills and the U.S. dollar bills are included, as a consequence, operation to designate detectors by operator on these kinds of bills is unnecessary, and operation properties are increased.

Still further in the invention, the U.S. dollar bills are sorted into bills with face value 100 dollars and ones with other face values, and authenticity/counterfeit determination is conducted by detectors with different determination principles to these respective face values, thereby it is possible to cope with the current conditions of counterfeit US dollar bills.

Figure 7:
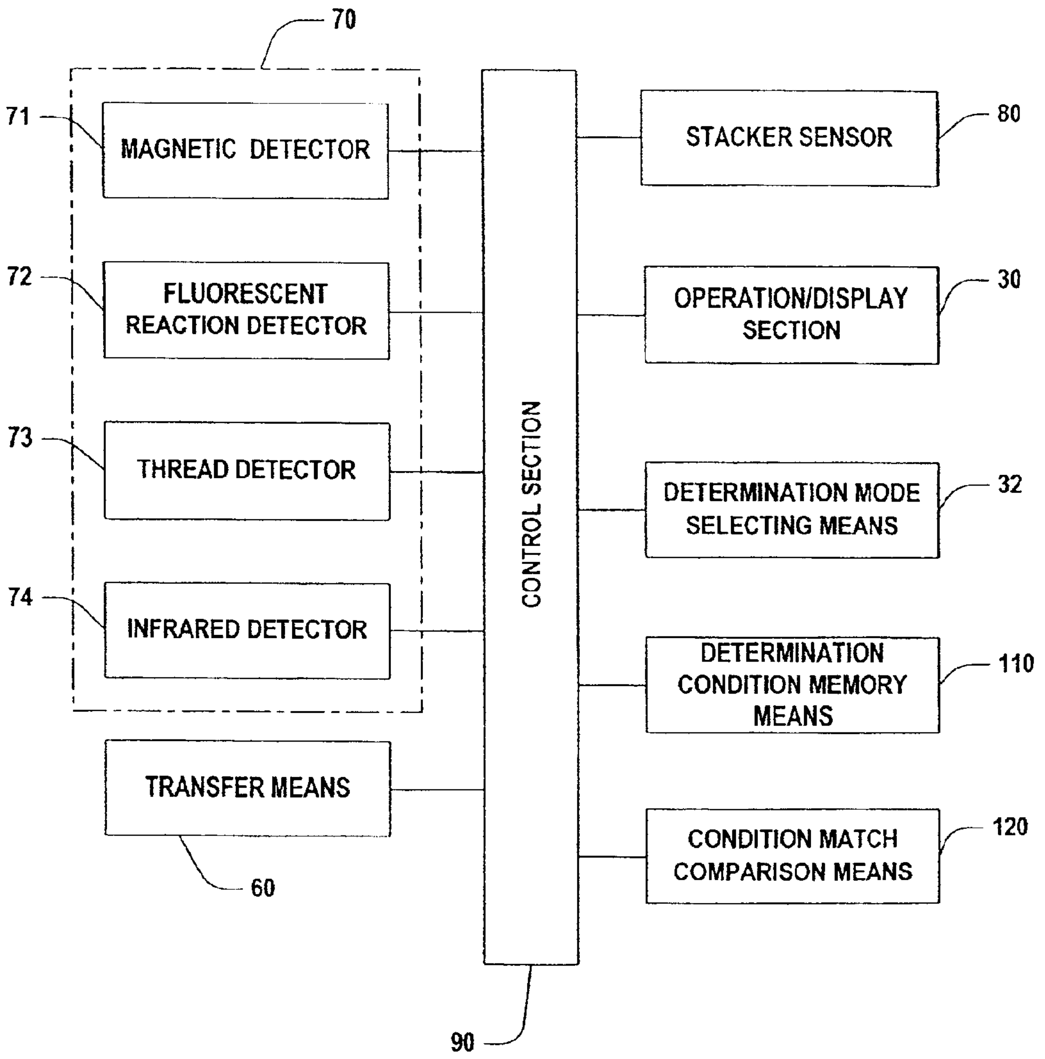
FIG. 7 is a block diagram concerning the another configuration of the present preferred embodiment.

FIG. 7 is a block diagram concerning the another structure of a bill counter according to the present invention. In the figure, the authenticity/counterfeit determination block comprises 4 kinds of detectors in total. As the magnetic detector 71, for example, a known magnetic head may be employed. The fluorescence detector 72 comprises an ultraviolet ray radiation light source and a light receiving element. As the thread detector 73, for example, one disclosed in Europe Patent Publication No. EP413534 A1 may be used. The infrared detector 74 comprises an infrared ray radiation light source and a ray receiving element. The stacker sensor 80 is for detecting whether there are bills at the collecting section 20 or not, and also may be used for authenticity/counterfeit determination of other kinds of bills by clearing determination conditions by detecting bills being pulled out. The operation/display section 30, when detecting bills with suspicion of counterfeit, displays to that effect (for instance, "CF" for Counterfeit meaning counterfeit). The determination mode selecting means 32 is used for selecting which authenticity/counterfeit determining means to be made effective.

Determination condition memory means 110 is for memorizing output presence or absence conditions per each detector on the firstly fed bill. In concrete presence of magnetic ink detection, absence of thread detection and so forth are memorized therein. The condition match comparison means 120 conducts comparison on the secondly fed bill and thereafter with the contents memorized in the determination condition memory means 110, and in the case of discrepancy, informs the control section 90 to the effect that there is suspicion of counterfeit, and the control section 90 in response to this information displays the effect on the display section 31 of the operation/display section 30, and also stops the transfer means 60.

Figure 8A:
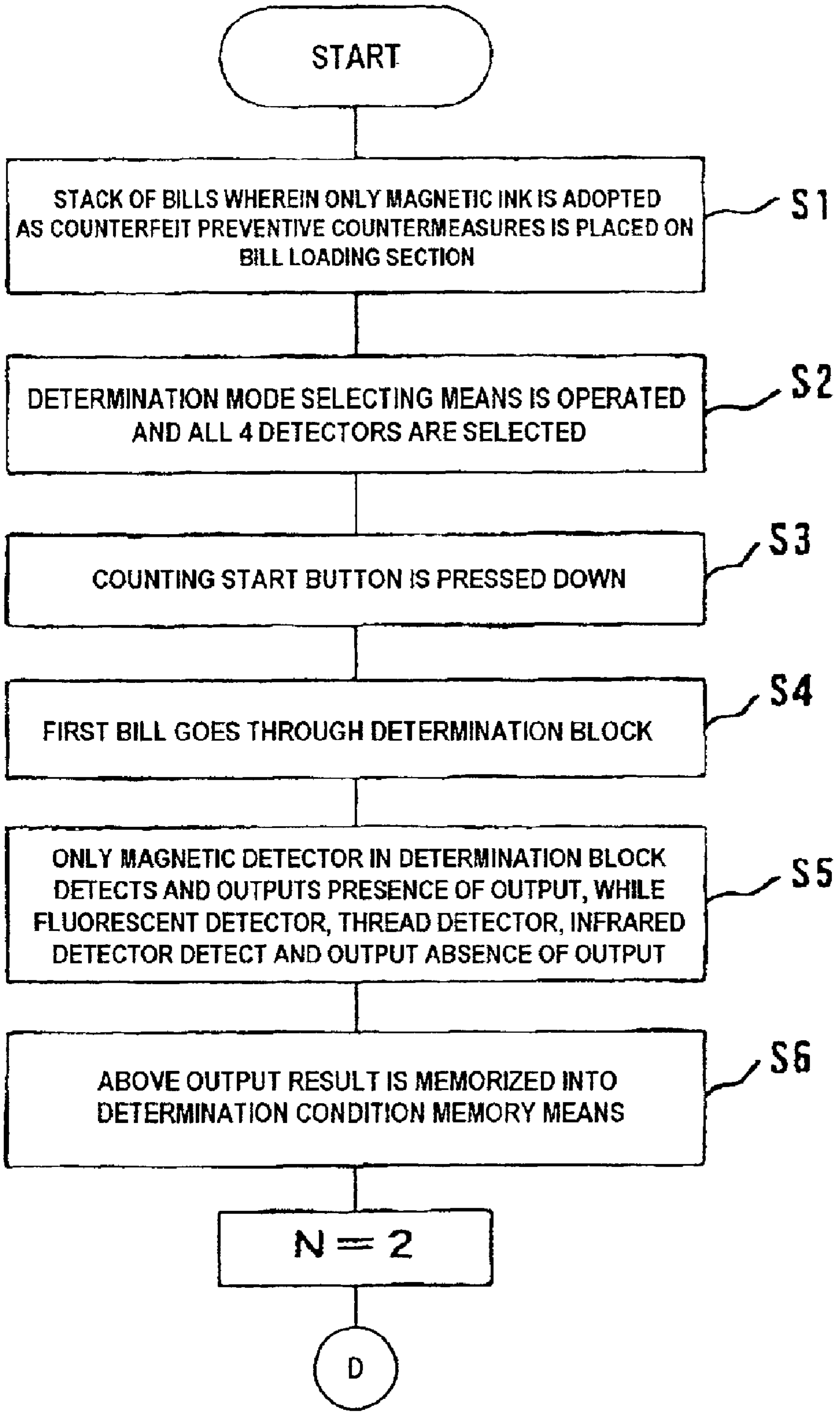
FIGS. 8A and 8B are flow charts of determination and counting in the case wherein objective bills are ones adopting only magnetic ink as counterfeit preventive countermeasures.
Figure 8B:
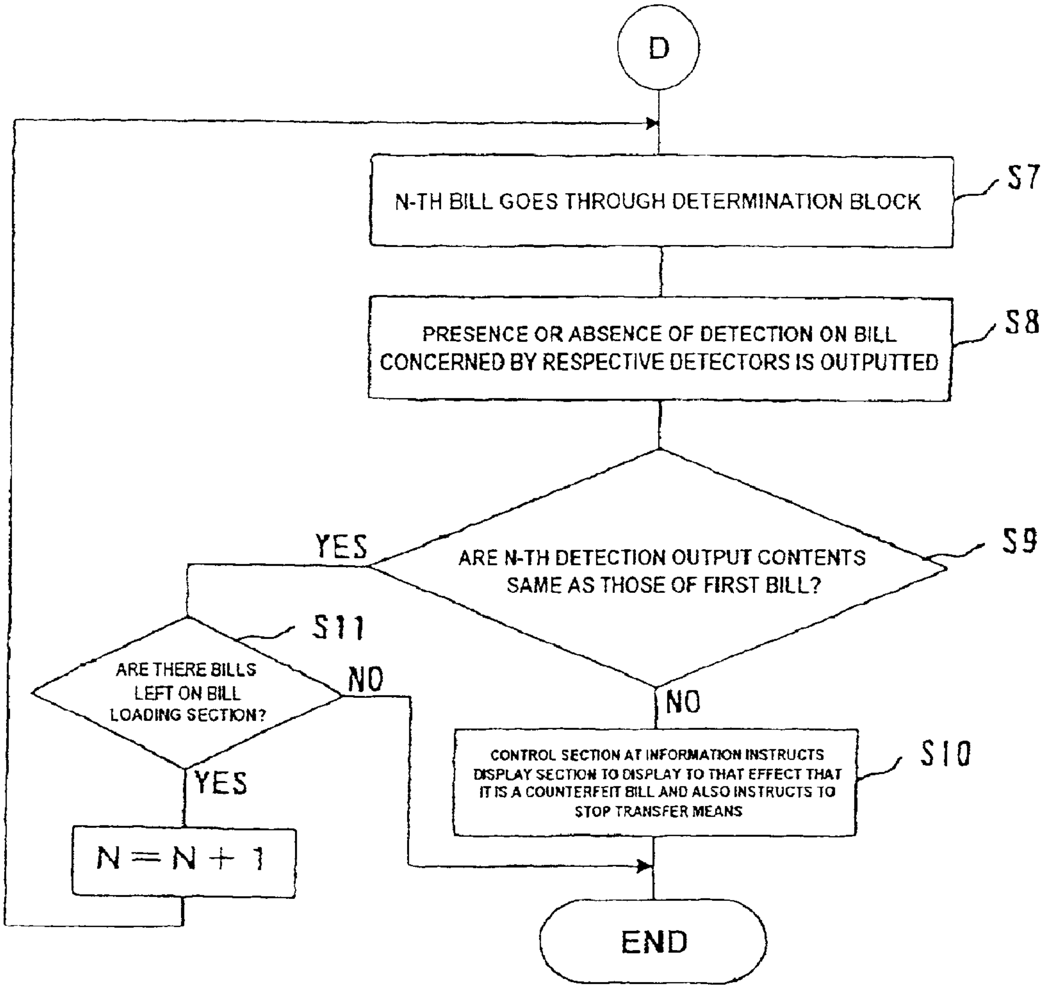

FIGS. 8A and 8B are flow charts of determination and counting in the case where the objective bills are bills wherein magnetic ink is adopted as counterfeit preventive measures, and in reference to this case, the procedures of authenticity/counterfeit determination and so forth by a bill counter according to the present invention are explained hereinafter. By the way, in the preferred embodiments of the present invention, as examples of plural kinds of authenticity/counterfeit determining means with different determining principles, magnetic ink detection, fluorescent reaction detection, thread detection, and infrared ink detection are adopted.

By the way, presence and absence of detection output in the present invention are defined per each kind of detectors as below. In the magnetic ink detection, presence of detection output means literally a case wherein output signal has been positively detected by magnetic components. In the fluorescent reaction detection, presence of detection output means a case wherein ultraviolet ray is radiated from an ultraviolet ray radiation light source onto a bill, and fluorescent reaction from the entire bill surface has been detected by a light receiving element. Namely, fluorescent reaction arising from bill paper quality or a bleaching agent is to be objective.

In the thread detection, presence of detection output means literally a case wherein changes in static electricity capacity or changes in magnetic flux caused by thread have been positively detected. In the infrared ink detection, presence of detection output means a case wherein as a result that infrared ray radiated from an infrared ray radiation light source is infrared ray absorbed by infrared absorbing ink printed on bills, infrared ray has not been detected by a light receiving element.

First, as objective bills, a stack of bills wherein only magnetic ink is adopted as counterfeit preventive countermeasures is placed on the bill loading section 10 in FIG. 1 (Step S1). Then, the determination mode selecting means 32 shown in FIG. 4 is operated and all the 4 detectors are selected (Step S2). By the way, by setting auto selection mode, all the authenticity/counterfeit determining means may be selected automatically when the bill counter is turned on. In this case, authenticity/counterfeit determining means that become unnecessary for some kinds of bills may be made invalid by the determination mode selecting means 32. When the counting start button 34 shown in FIG. 4 is pressed down (Step S3), the lowest one of the bills loaded on the bill loading section 10 is sent as the first bill to the determination block 70 (Step S4). By the way, in the Step S3, if auto start mode is set wherein counting gets started automatically when bills are put on the bill loading section 10, there is no need to press the counting start button 34.

In this case, wherein bills are ones adopting only magnetic ink as counterfeit preventive countermeasures, there is not infrared absorbing ink, so even if infrared ray is radiated onto bills, infrared ray is not absorbed, therefore, infrared ray goes through bills, and infrared ray is detected, but according to the above definition, it is handled as no detection output. Only the magnetic detector in the determination block detects and outputs the presence of output, while the fluorescent detector/thread detector/infrared detector detect and output the absence of output (Step S5). Then, this output result (condition) is memorized into the determination condition memory means 110 (Step S6). Next, the second bill is fed and sent to the determination block 70 (Step S7), and the presence or absence of detection on the bill concerned by the respective detectors is outputted (Step S8), and comparison to see whether it matches or not is conducted by the condition match comparison means 120 (Step S9). If it matches herein, on the condition that bills are left on the bill loading section 10 (Step S11), the process goes back to the Step 7 for processing on the third bill, while if it is determined as not to match, the effect is informed to the control section, and the control section at the information instructs the display section to display to that effect that it is a counterfeit bill and also instructs to stop the transfer means (Step S10).

The above is the explanation on the flow of authenticity/counterfeit determination and counting in the case wherein objective bills are ones adopting only magnetic ink as counterfeit preventive countermeasures, however, it goes without saying that actions are same as for other bills wherein other counterfeit preventive countermeasures are taken.

A bill counter according to the present invention reads the characteristics of counterfeit preventive countermeasures in the firstly fed bill, and automatically conducts authenticity/counterfeit determination on the basis of the information, as a consequence, it may be used for handling bills of nations over the world, without necessity for an operator to set up authenticity/counterfeit determination conditions.

Especially in the Euro bloc, they must handle both their own nation's bills and Euro bills as common bills, while the adoption of a bill counter according to the present invention enables to handle these different kinds of bills well only by sorting them into bill kinds, without setting authenticity/counterfeit determination conditions according to kinds. This is same to banks wherein plural foreign currency bills are handled.

By the way, it is also available to use a stacker sensor 80 shown in FIG. 2 for resetting bill determination conditions. Namely, while there are bills at the collecting section 20, the previous bill determination conditions are set to be held, and when there is no bill any more on the collecting section 20, it is determined that process is complete, and the bill determination conditions are cleared. By arrangement in this manner, even when all the bills are sent from the bill loading section to the collecting section and there is no bill any more, when to further add the same kind of bills and process them, the determination conditions may be held by not taking bills out of the collecting section As mentioned heretofore, according to the invention described, wherein output presence/output absence of plural kinds of detectors on the firstly processed bill is detected, and the result is compared with the detection output of the secondly processed bill and thereafter, thereby authenticity/counterfeit determination is conducted, irrespective of counterfeit preventive countermeasures on objective bills, setting of authenticity/counterfeit determination conditions per each of counterfeit preventive countermeasures of objective bills by operator is unnecessary, and operating properties are increased.

According to the invention, wherein transfer is suspended when a bill of suspicion of counterfeit is detected, it is possible to easily sort out the bill with suspicion and other bills (bills that have been determined as authentic).

According to the invention, when there is only one objective bill and there is no second bill or thereafter, and comparison of authenticity/counterfeit determination conditions cannot be made accordingly, and authenticity/counterfeit determination cannot be conducted automatically, the kind of detector to which the only one objective bill has reacted (i.e., has outputted) is displayed to inform operator, thereby it is possible to make the authenticity/counterfeit determination further convenient.

Further more specifically, in the present invention, authenticity/counterfeit determination conditions are automatically set according to a bill to be processed first. Accordingly, in the case when a bill to be processed first happens to be a counterfeit bill, the second authentic bill and thereafter are determined as suspicious as counterfeit bills. Nevertheless, the kind of detector that has had output on the bill processed first is displayed to operator, therefore, on the condition that operator is well informed of authenticity/counterfeit information about objective bills in advance, it is possible for operator to know that the bill first processed is a counterfeit bill according to the information.

The invention is simplified to be structured with a single authenticity/counterfeit determining means. If output is detected on the first bill by the single authenticity/counterfeit determining means, when the similar output is obtained on the second bill and thereafter, it is determined that bills are authentic ones. On the other hand, if output is not detected on the first bill by the single authenticity/counterfeit determining means, when output is obtained on the second bill and thereafter, it is determined that the bill concerned is a counterfeit bill, however, this may be used rather for finding out the case wherein different kinds of bills are mixed in objective bills.

What is claimed is:

1. A bill counter, comprising:

a bill loading section for loading a plurality of bills into the counter;

feeding means for feeding bills individually from the bill loading section;

transfer means for transferring bills fed by the feeding means to a collecting section;

authenticity/counterfeit determining means arranged between the feeding means and the collecting section for determining whether bills are authentic or not and including a plurality of types of detectors, each detector having different authenticity determining principles;

determination condition memory means for detecting the presence or absence of output from each detector in response to a first bill transferred from the feeding means and for memorizing initial detection results from each detector; and condition match comparing means for comparing detection results from the detectors in response to subsequently transferred bills with the initial detection results and for determining that a bill is counterfeit when at least one of the subsequent detection results does not match the initial detection results.

2. A bill counter according to claim 1, wherein when there is no output from the plurality of detectors in response to the first bill, any output in response to subsequent bills is ignored.

3. A bill counter according to claim 2, wherein the plurality of detectors include at least one of magnetic detectors, fluorescent reaction detectors, thread detectors and infrared ink detectors.

4. A bill counter according to claim 2, wherein upon detection of a mismatch between the initial detection results and subsequent detection results, the transfer means is controlled to stop.

5. A bill counter according to claim 2, further comprising a display section for displaying the initial detection results and other indications concerning the detectors.

6. A bill counter according to claim 1, wherein the plurality of detectors include at least one of magnetic detectors, fluorescent reaction detectors, thread detectors and infrared ink detectors.

7. A bill counter according to claim 6, wherein upon detection of a mismatch between the initial detection results and subsequent detection results, the transfer means is controlled to stop.

8. A bill counter according to claim 6, further comprising a display section for displaying the initial detection results and other indications concerning the detectors.

9. A bill counter according to claim 1, wherein upon detection of a mismatch between the initial detection results and subsequent detection results, the transfer means is controlled to stop.

10. A bill counter according to claim 9, further comprising a display section for displaying the initial detection results and other indications concerning the detectors.

11. A bill counter according to claim 1, further comprising a display section for displaying the initial detection results and other indications concerning the detectors.

12. A bill counter, comprising:

a bill loading section for loading a plurality of bills into the counter;

feeding means for feeding bills individually from the bill loading section;

transfer means for transferring bills fed by the feeding means to a collecting section;

authenticity/counterfeit determining means arranged between the feeding means and the collecting section for determining whether bills are authentic or not and including a single type of detectors;

determination condition memory means for detecting the presence or absence of output from the detectors in response to a first bill transferred from the feeding means and for memorizing initial detection results from each detector; and condition match comparing means for comparing detection results from the detectors in response to subsequently transferred bills with the initial detection results and for determining that a bill is counterfeit when at least one of the subsequent detection results does not match the initial detection results.

13. A bill counter according to claim 12, wherein upon detection a mismatch between the initial detection results and subsequent detection results, the transfer means is controlled to stop.

14. A bill counter, comprising:

a bill loading section for loading a plurality of bills into the counter;

feeding means for feeding bills individually from the bill loading section;

transfer means for transferring bills fed by the feeding means to a collecting section; and authenticity/counterfeit determining means arranged between the feeding means and the collecting section for determining whether bills are authentic or not and including a single type of detectors, wherein the presence or absence of output from the detectors is detected in response to a first bill transferred from the feeding means and when there is no detector output in response to the first bill, detector output in response to subsequent bills is ignored.

* * * * *